US008817179B2

(12) United States Patent
Zhu et al.

(10) Patent No.: US 8,817,179 B2
(45) Date of Patent: Aug. 26, 2014

(54) CHROMA FRAME CONVERSION FOR THE VIDEO CODEC

(71) Applicant: Microsoft Corporation, Redmond, WA (US)

(72) Inventors: Lihua Zhu, Mountain View, CA (US); Sridhar Sankuratri, Campbell, CA (US); B. Anil Kumar, Saratoga, CA (US); Nadim Abdo, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 13/736,688

(22) Filed: Jan. 8, 2013

(65) Prior Publication Data

US 2014/0192261 A1 Jul. 10, 2014

(51) Int. Cl.
H04N 11/20 (2006.01)
(52) U.S. Cl.
USPC .......................................... 348/453; 348/459
(58) Field of Classification Search
CPC ..... H04N 7/01; H04N 7/0127; H04N 7/0112; H04N 11/20; H04N 7/0135; H04N 7/0125; H04N 7/012
USPC .................. 348/441, 458, 459, 453, 444, 450
IPC .............................................. H04N 7/01, 11/20
See application file for complete search history.

(56) References Cited

U.S. PATENT DOCUMENTS

| 5,692,063 | A | 11/1997 | Lee et al. |
| 6,529,244 | B1 | 3/2003 | Hrusecky |
| 7,064,790 | B1 | 6/2006 | Varma et al. |
| 7,474,355 | B2 | 1/2009 | Leone et al. |
| 7,933,339 | B2 | 4/2011 | Rodriguez |
| 2009/0015713 | A1* | 1/2009 | Horton .......................... 348/453 |
| 2012/0008679 | A1 | 1/2012 | Bakke |

FOREIGN PATENT DOCUMENTS

EP 1542476 A2 6/2005

OTHER PUBLICATIONS

Wong, et al, "An Adaptive Video Sub-sampling Technique for the Conversion between High and Low Resolution", In IEEE International Symposium on Circuits and Systems, May 31, 1998, 4 pages.
Kim, et al.,"Residue Sampling for Image and Video Compression", In Proceedings of Visual Communications and Image Processing, Jul. 12, 2005, 8 pages.
Wu Y, et al., "Frame Packing Arrangement SEI for 4:4:4: Content in 4:2:0 Bitstreams", Joint Collaborative Team on Vieo Coding (JCT-VC) of ITU-T SG 16 W 3 and ISO/IEC JTC 1/SC 29/WG 11; Shanghai, CN; Oct. 2012, 7 pages.

* cited by examiner

*Primary Examiner* — Sherrie Hsia
(74) *Attorney, Agent, or Firm* — Jim Sfekas; Peter Taylor; Micky Minhas

(57) ABSTRACT

Converting a first format frame to one or more second format frames. In one embodiment, a method includes accessing a first format frame using n coefficients, where n is the total number of coefficients used for the Y, U and V planes of the first format frame. The method further includes mapping the coefficients of the first format frame to coefficients of one or more second format frames. The one or more second format frames have n coefficients across all of the second format frames matching the n coefficients of the first format frame.

21 Claims, 14 Drawing Sheets

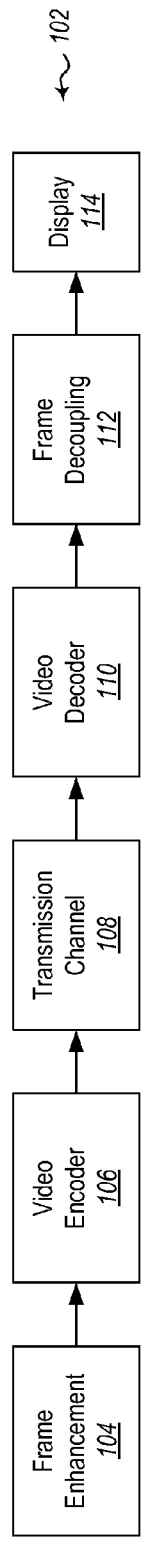
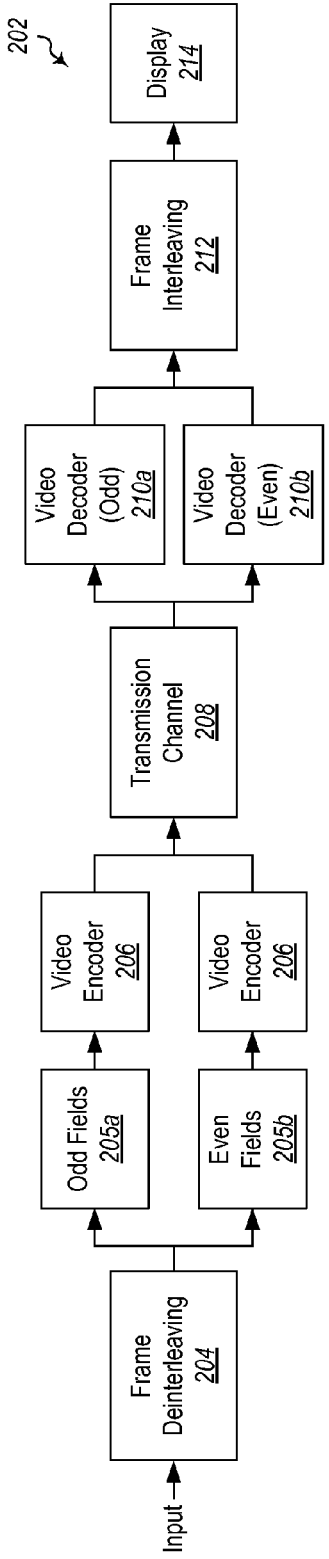
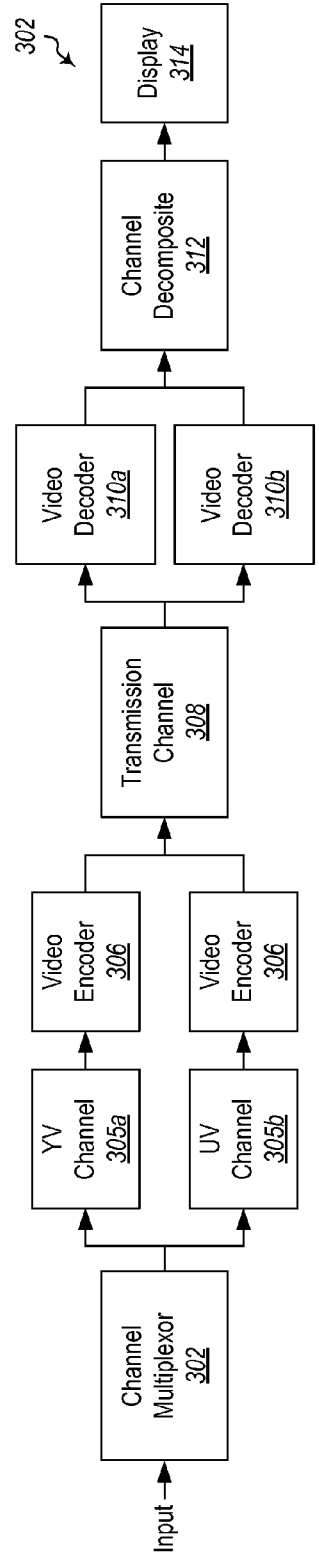
*Figure 1*
*Figure 2*
*Figure 3*

CHROMA FRAME CONVERSION FOR THE VIDEO CODEC

BACKGROUND

Background and Relevant Art

Computers and computing systems have affected nearly every aspect of modern living. Computers are generally involved in work, recreation, healthcare, transportation, entertainment, household management, etc. Computer systems are often cable of outputting video image to users.

Many presently available video encoders and decoders, especially among consumer level computer products, preferentially support the YUV 4:2:0 chroma sub-sampling format. However, video is often in the YUV 4:4:4 format. Thus, the video frames are converted from the YUV 4:4:4 format to the 4:2:0 format. The 4:2:0 format can provide a satisfactory user experience for normal natural video without trivial texture in that most people do not notice the visual artifacts that may be present. However, for the screen and animation contents, the 4:2:0 sub-sampling format results in very noticeable artifacts especially in texts.

The subject matter claimed herein is not limited to embodiments that solve any disadvantages or that operate only in environments such as those described above. Rather, this background is only provided to illustrate one w exemplary technology area where some embodiments described herein may be practiced.

BRIEF SUMMARY

One embodiment illustrated herein includes a method that may be practiced in a computing environment. The method includes acts for converting a YUV 4:4:4 frame to one or more YUV 4:2:0 frames. The method includes accessing YUV 4:4:4 frame using n coefficients, where n is the total number of coefficients used for the Y, U and V planes of the YUV 4:4:4 frame. The method further includes mapping the coefficients of the YUV 4:4:4 frame to coefficients of one or more YUV 4:2:0 frames. The one or more YUV 4:2:0 frames have n coefficients across all of the YUV 4:2:0 frames matching the n coefficients of the YUV 4:4:4 frame.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 1 illustrates a workflow for a spatial enhancement method of converting a YUV 4:4:4 frame to a YUV 4:2:0 frame;

FIG. 2 illustrates a workflow of a temporal interleaved method of converting a YUV 4:4:4 frame to a YUV 4:2:0 frame;

FIG. 3 shows the workflow of channel multiplexor method of converting a YUV 4:4:4 frame to a YUV 4:2:0 frame;

DETAILED DESCRIPTION

Figure 4:
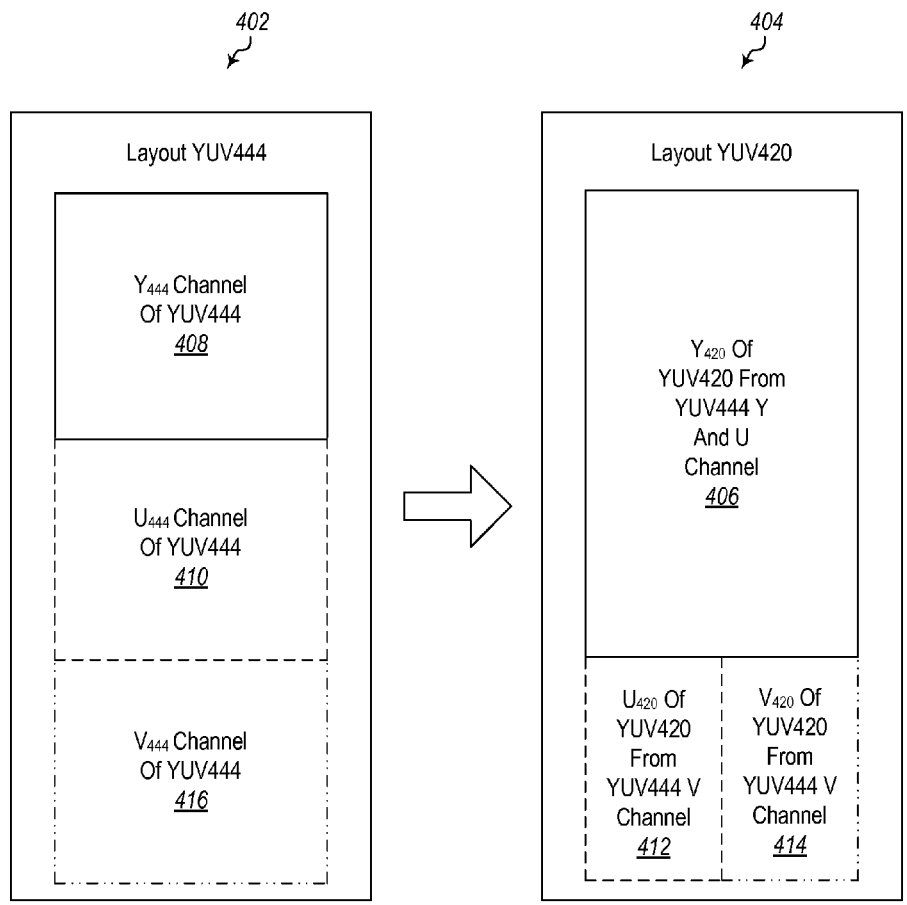
FIG. 4 illustrates additional details regarding the spatial enhancement method.

The following illustrates three frame conversion methods to convert from YUV 4:4:4 to YUV 4:2:0 in a fashion which not only addresses annoying artifacts, but are performed such that the converted frames have a high temporal and texture correlation which can bring benefits to give better compression results. Because of the high temporal and texture correlation, the methods are motion estimation and filtering friendly so that coding complexity can be reduced and coding efficiency can be improved. Also, the methods, and in particular, the first and second methods, can be used with many existing standards based codecs like MPEG-2, MPEG-4 Part 2, MPEG AVC/H.264, VC1, HEVC, etc.

In a YUV 4:4:4 layout, each plane (i.e. Y, U and V) has a coefficient for each pixel in a frame. Converting a YUV 4:4:4 frame to a YUV 4:2:0 frame results in half the number of coefficients. For example, a 10 pixel by 10 pixel frame in YUV 4:4:4 will have 300 coefficients, 100 for the Y plane, 100 for the U plane, and 100 for the V plane. In traditional methods, converting this frame to a YUV 4:2:0 frame results in a frame that has 150 coefficients because of downsampling in the UV plane, namely 100 coefficients in the Y plane, 25 coefficients in the U plane and 25 coefficients in the V plane. In particular, while a YUV 4:4:4 frame has an equal number of coefficients for each plane, a YUV 4:2:0 frame has 100% of its coefficients in the Y plane, 25% of its coefficients in the U plane and 25% of its coefficients in the Z plane. This can result in loss of information when frames are converted from YUV 4:4:4 to YUV 4:2:0. Thus, some embodiments can overcome this loss of information by in essence doubling the number of coefficients of a YUV 4:4:4 frame prior to converting to a YUV 4:2:0 frame. Alternatively, coefficients of a YUV 4:4:4 frame may be mapped to one or more YUV 4:2:0 frames where the YUV 4:2:0 frame(s) (as a sum total) have the same number of coefficients as a YUV 4:4:4 frame.

For example, in some embodiments, a YUV 4:4:4 frame with n coefficients may be mapped to a spatially equivalent YUV 4:2:0 frame with n coefficients. Alternatively, a YUV 4:4:4 frame with n coefficients may be temporally mapped to two YUV 4:2:0 frames with n/2 coefficients (or four YUV 4:2:0 frames with n/4 coefficients, etc.). In yet another example, a YUV 4:4:4 frame with n coefficients may be multiplexed to two YUV 4:2:0 frames with n/2 coefficients (or four YUV 4:2:0 frames with n/4 coefficients, etc.).

FIGS. 1, 2 and 3 illustrate workflows that can be used for three different conversion methods.

FIG. 1 illustrates a workflow 102 for a spatial enhancement method. The input for a spatial frame enhancement module 104 is a YUV 4:4:4 frame. The spatial frame enhancement module 104 will generate a YUV 4:2:0 frame with the double height of the original YUV 4:4:4 frame. The generated frame can be directly input to a video encoder 106.

The video encoder 106 may be implemented in various different forms. For example, in some embodiments, the video encoder 106 may be a hardware video encoder included in an electronic device, such as a handheld or other consumer electronic device. In some embodiments, the video encoder 106 may be a hardware based video encoder optimized for YUV4:2:0 video encoding (or other optimized encoding formats) while not having optimized functionality for YUV 4:4:4 video encoding (or other non-optimized encoding formats) resulting in more distortions when processing formats for which the hardware is not optimized than when processing formats for which the hardware is optimized. Alternatively, the video encoder 106 may be a software video encoder implemented by executing software modules configured to perform video encoding. The video encoder 106 will generate bit streams as the input to a transmission channel 108.

The transmission channel 108 may be implemented in various forms. For example, in some embodiments, the transmission channel may include storage. For example, the transmission channel may include one or more of a database, flat file storage, disk storage, memory storage, etc. Alternatively or additionally, the transmission channel may include one or more network channels such as wired or wireless Ethernet channels, device interconnection bus channels, etc.

A decoder site 110 will retrieve the bit streams from the transmission channel 108 to decode a YUV 4:2:0 frame. Using the inverse procedure of the spatial enhancement, the decoded YUV 4:2:0 frame can be reorganized by a frame decoupling module 112 to a YUV 4:4:4 frame such that it can be displayed on a display 114.

Figure 5:
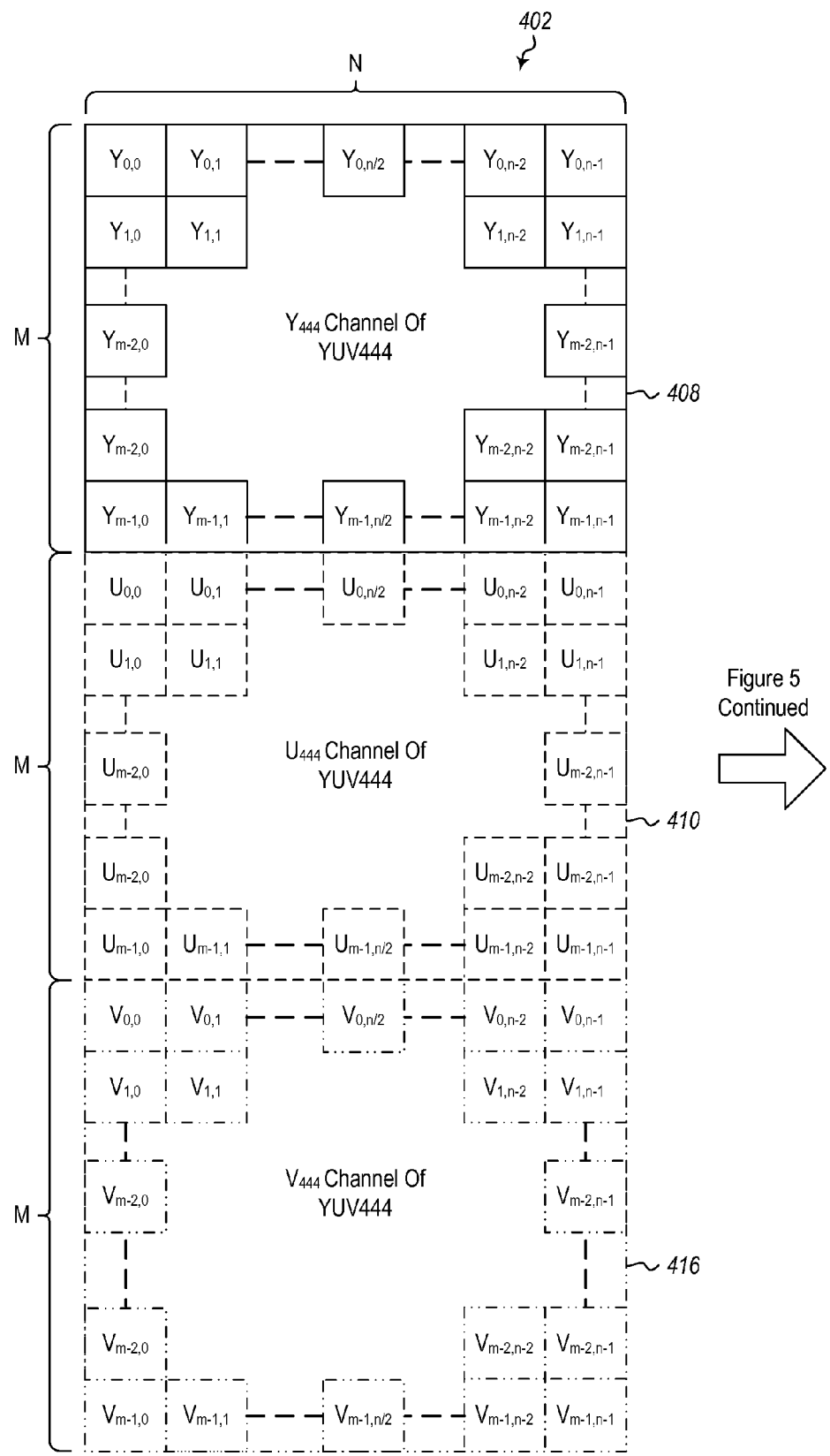
FIG. 5 illustrates additional details regarding the spatial enhancement method.
Figure 5:
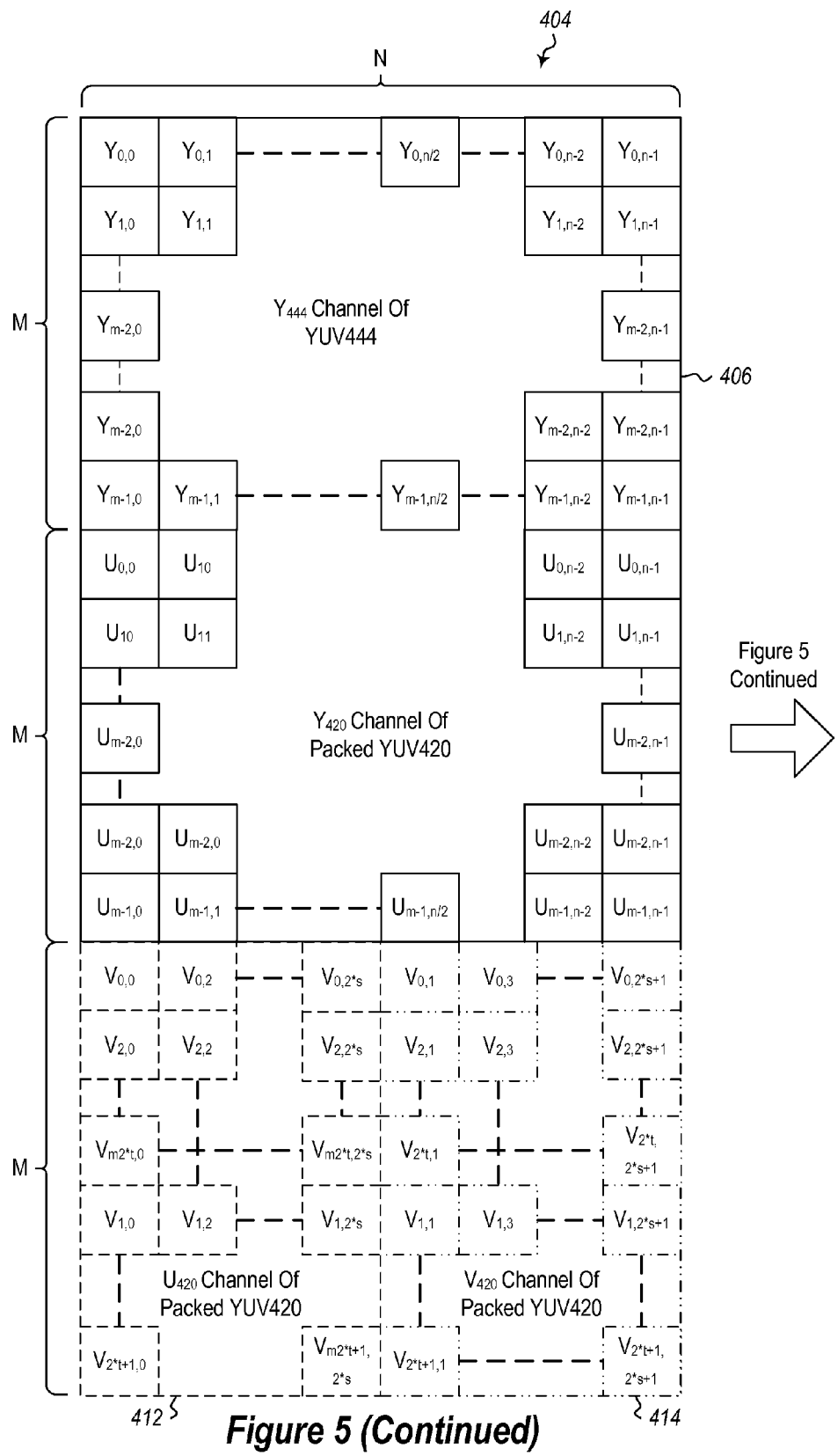
Figure 5:
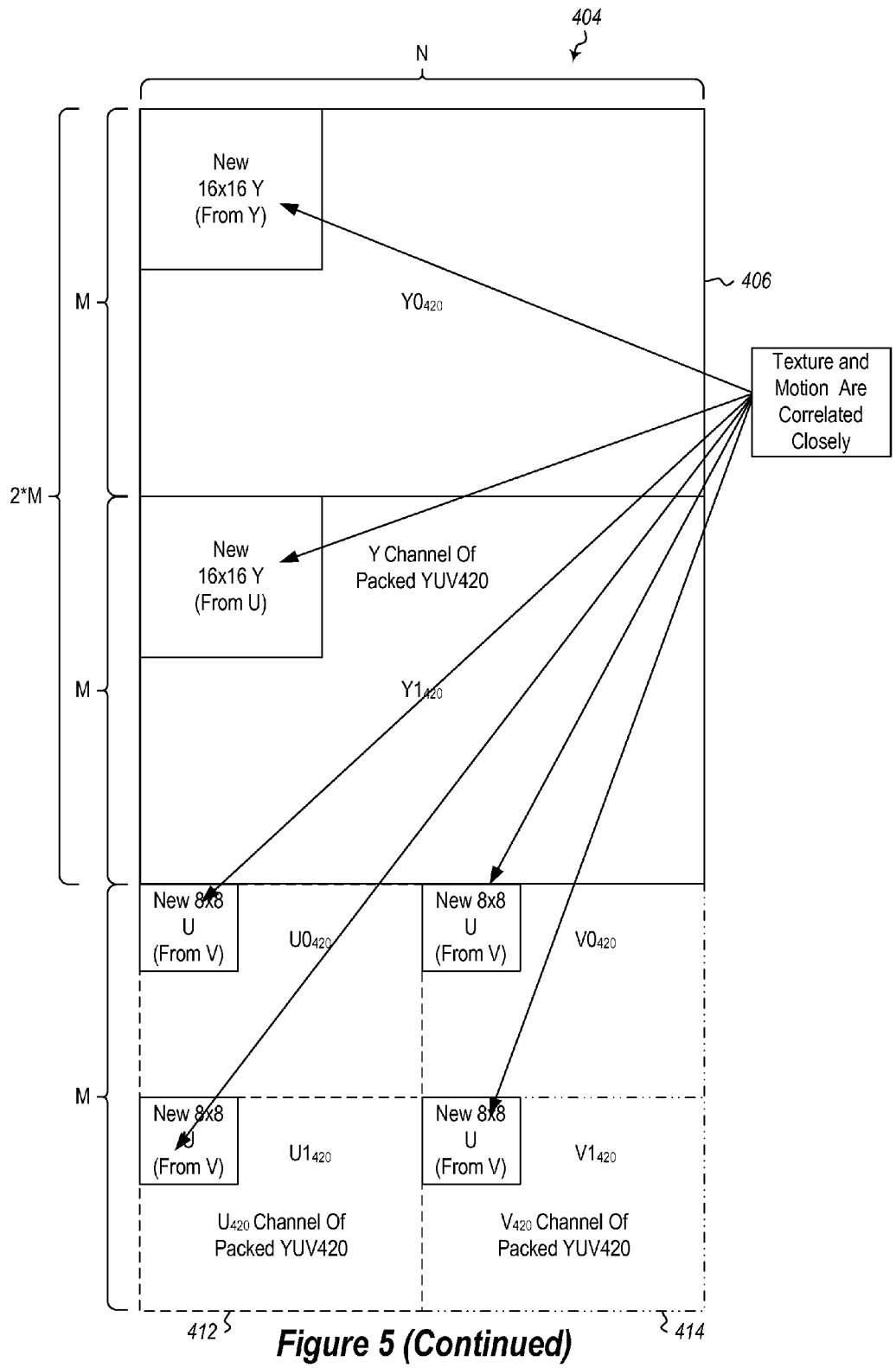

As shown in FIG. 4, the spatial enhancement method uses a YUV 4:2:0 container frame 404 which has the 2× height resolution as the original YUV 4:4:4 frame 402. The Y channel 406 (or plane) of the YUV 4:2:0 frame 404 is composed of the coefficients of the Y channel 408 and U channel 410 from the original YUV 4:4:4 frame 402. The top half plane of the Y channel 406 of the YUV 4:2:0 frame 404 can be the Y plane 408 of the YUV 4:4:4 frame 402 and the bottom half plane of the Y channel 406 of the YUV 4:2:0 frame 404 can be the coefficients of the U plane 410 of YUV 4:4:4 frame. The U channel 412 and V channel 414 of the YUV 4:2:0 frame 404 are generated from the V channel 416 from the YUV 4:4:4 frame 402. To guarantee the temporal correlation among the generated Y, U and V channels, FIG. 5 shows how to reorganize the YUV 4:4:4 frame 402 to the YUV 4:2:0 frame 404. The arrows in the FIG. 5 show the correlation among the generated Y, U and V channels. The following illustrates the correlation:

$Y0420(x,y)=Y444(x,y)$ where Y0420 is the top half plane of Y channel of YUV 4:2:0, and Y444 is the entire Y plane of YUV 4:4:4.

$Y1420(x,y)=U444(x,y)$ where Y1420 is the bottom half plane of Y channel of YUV 4:2:0, and U444 is the entire U plane of YUV 4:4:4.

$U0420(x,y)=V444(2^*t,2^*s)$ where U0420 is the top half plane of U channel of YUV 4:2:0, and V444 is parth of V plane of YUV 4:4:4.

$$t \in (0, m/2-1) \, s \in (0, n/2-1)$$

$V0420(x,y)=V444(2^*t,2^*s+1)$ where V0420 is the top half plane of V channel of YUV 4:2:0, and V444 is parth of V plane of YUV 4:4:4.

$$t \in (0, m/2-1) \, s \in (0, n/2-1)$$

$U1420(x,y)=V444(2^*t+1,2^*s)$ where U1420 is the bottom half plane of U channel of YUV 4:2:0, and V444 is parth of V plane of YUV 4:4:4.

$$t \in (0, m/2-1) \, s \in (0, n/2-1)$$

$V1420(x,y)=V444(2^*t+1,2^*s+1)$ where V1420 is the bottom half plane of V channel of YUV 4:2:0, and V444 is parth of V plane of YUV 4:4:4.

$$t \in (0, m/2-1) \, s \in (0, n/2-1)$$

FIG. 2 shows the workflow 202 of a temporal interleaved method. The temporal interleaved module accepts a YUV 4:4:4 frame 602 (see FIG. 6). The temporal interleaved module will generate two YUV 4:2:0 frames, one with odd fields 205a and one with even fields 205b, with each of the two YUV 4:2:0 frames 604a and 604b having the same resolution as the original YUV 4:4:4 frame 602. The generated frames 604a and 604b can be directly fed into the video encoder 206 sequentially (or in parallel depending on the encoder design). The video encoder 206 will generate bit streams as the input to the transmission channel 208 which can be, for example, storage or networks as illustrated in the previous example. A decoder site will retrieve the bit streams from the transmission channel 208 to decode these two YUV 4:2:0 frames 604a and 604b. The decoded YUV 4:2:0 frames can be interleaved at a frame interleaver module 212 to a YUV 4:4:4 frame.

Figure 6:
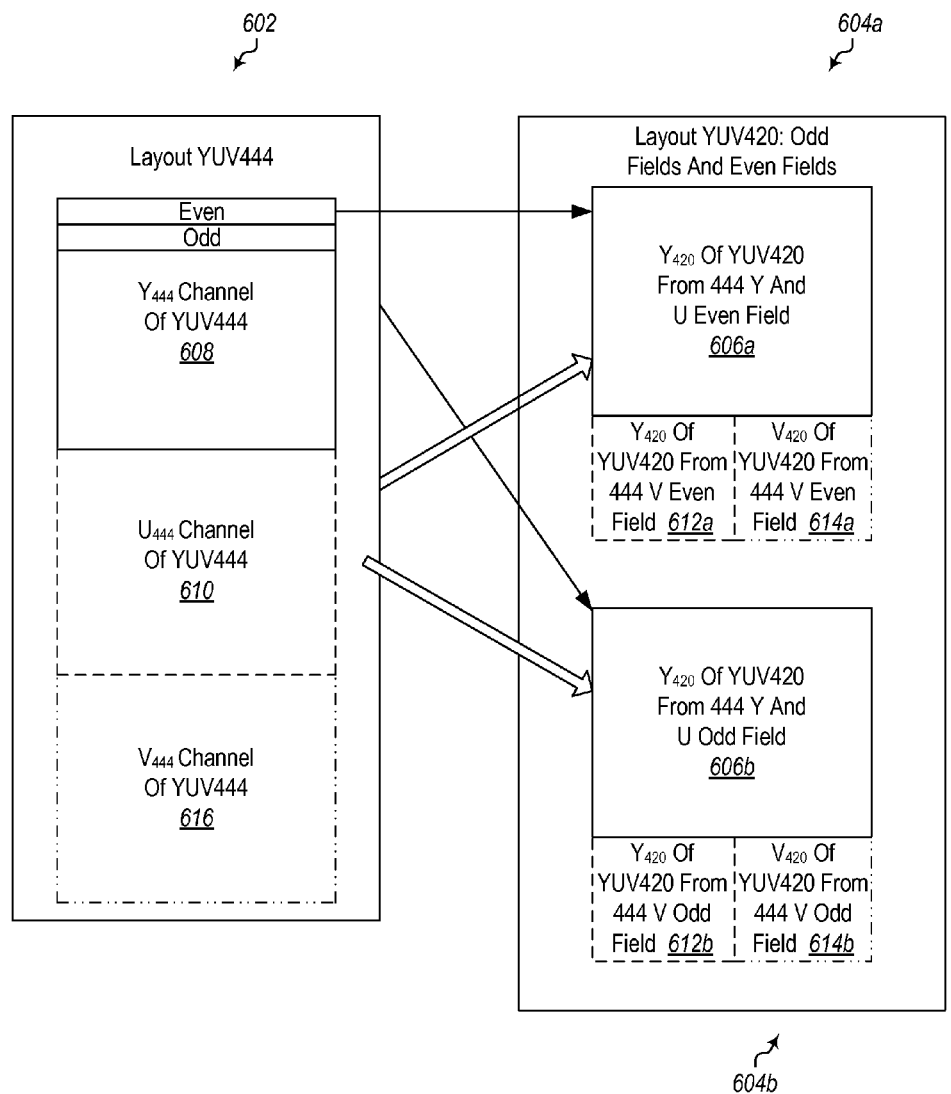
FIG. 6 illustrates additional details regarding the temporal interleaved method.
Figure 7:
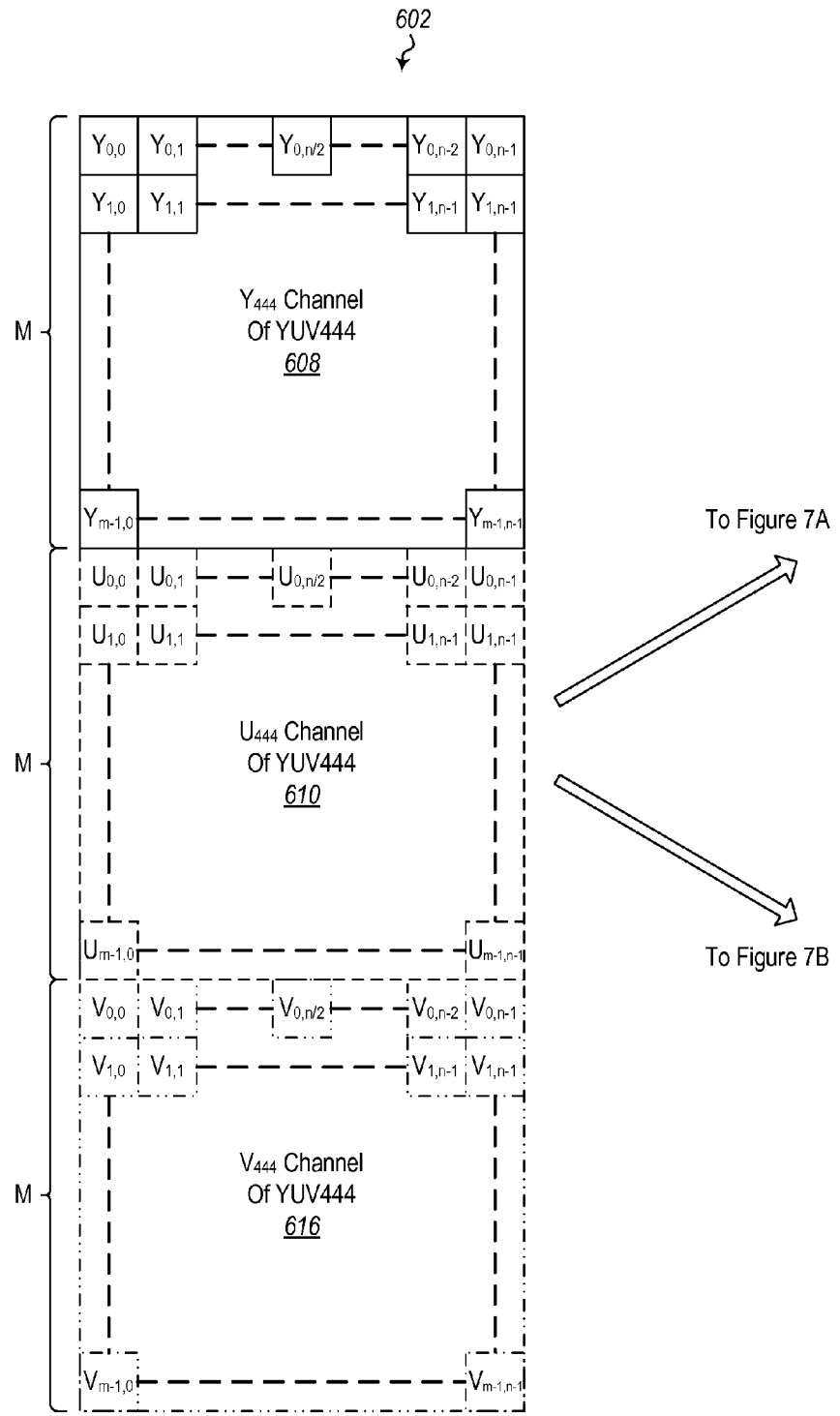
FIG. 7 illustrates additional details regarding the temporal interleaved method.
Figure 7A:
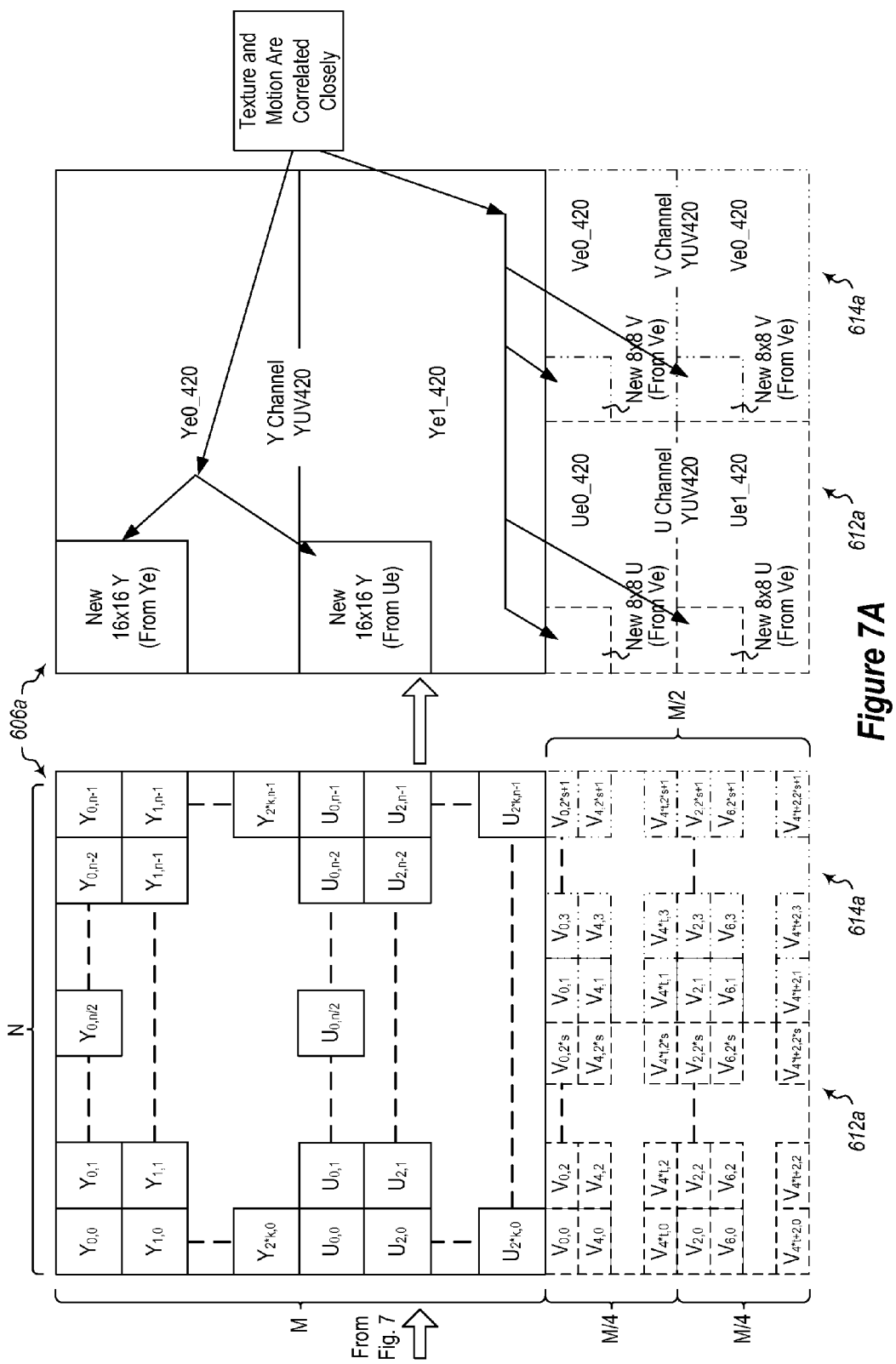
FIG. 7A illustrates additional details regarding the temporal interleaved method.
Figure 7B:
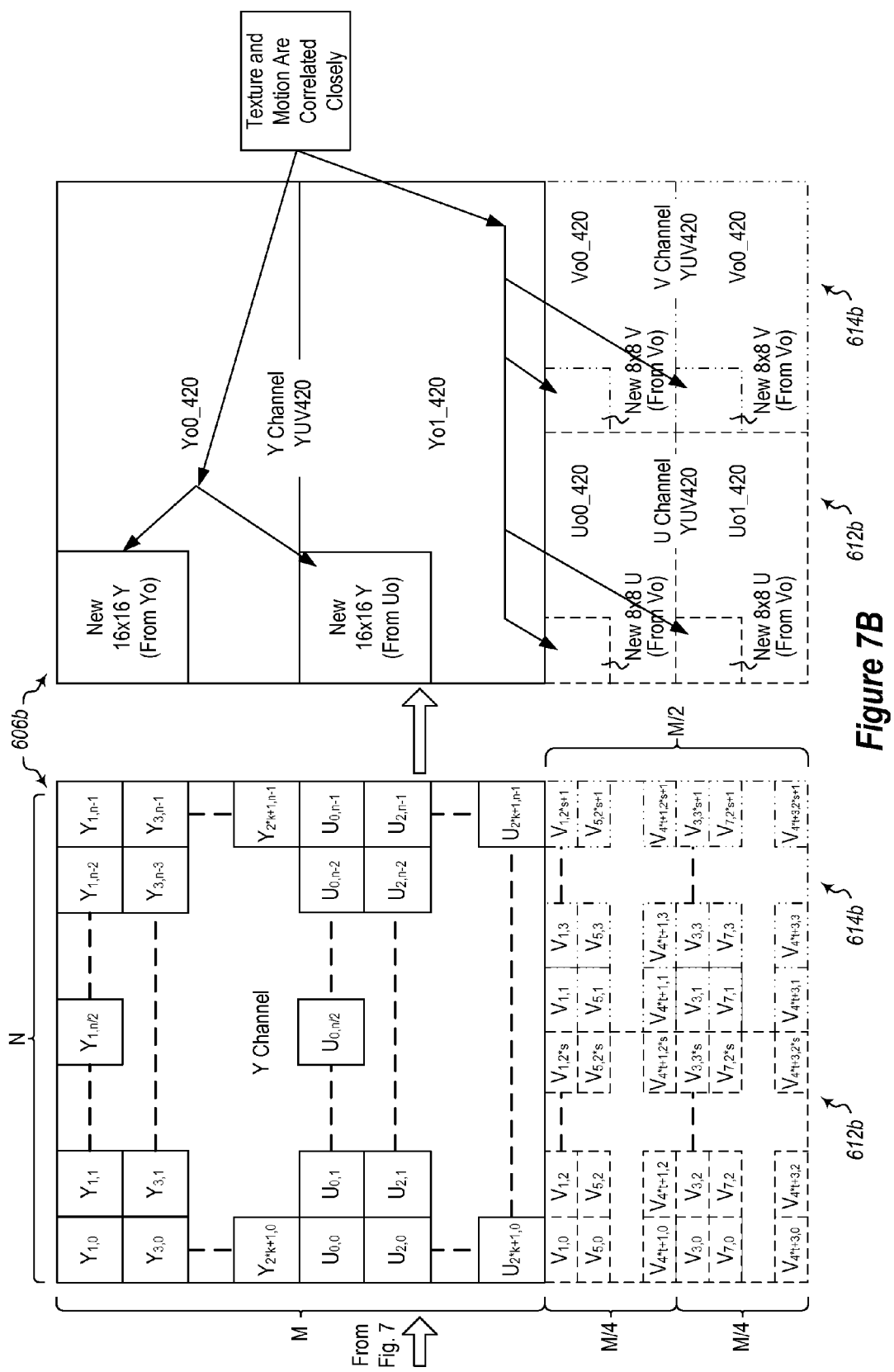
FIG. 7B illustrates additional details regarding the temporal interleaved method.

As shown in FIG. 6, the temporal interleaved method uses two YUV 4:2:0 container frames 604a and 604b which have the same resolution as the original YUV 4:4:4 frame 602. The Y channel 606a of the first YUV 4:2:0 frame 604a is composed by the Y channel 608 and U channel 610 from the original YUV 4:4:4 frame 602 even fields. The top half plane of the Y channel 606a of the first YUV 4:2:0 frame 604a can be the Y plane 608 of the YUV 4:4:4 frame 602 even fields and the bottom half plane of the Y channel 606a of first YUV 4:2:0 frame 604a can be the U plane 610 of the YUV 4:4:4 frame 602 even field. The U and V channels 612a and 612b of the first YUV 4:2:0 frame 604a are generated from the V channel 616 from the YUV 4:4:4 frame 602 even fields. The same strategy applies to the second YUV 4:2:0 frame 604b which is composed by the odd fields of the original YUV 4:4:4 frame 602. To guarantee the temporal correlation among the generated Y, U and V channels, FIG. 7 shows how to reorganize a YUV 4:4:4 frame 602 to two YUV 4:2:0 frames 604a and 604b. The arrows in the FIG. 7 show the correlation among the generated Y, U and V channels.

The following illustrates how the frames are arranged:

Ye0420(x,y)=Y444(2*t,s) where Ye0420 is the top half plane of Y channel of the first YUV 4:2:0, and Y444 is the entire Y plane of YUV 4:4:4

$t \in (0, m/2-1) s \in (0, n-1)$

Ye1420(x,y)=U444(2*t,s) where Ye1420 is the bottom half plane of Y channel of the first YUV 4:2:0, and U444 is the entire U plane of YUV 4:4:4

$t \in (0, m/2-1) s \in (0, n-1)$

Ue0420(x,y)=V444(4*t,2*s) where Ue0420 is the top half plane of U channel of the first YUV 4:2:0, and V444 is part h of V plane of YUV 4:4:4

$t \in (0, m/4-1) s \in (0, n/2-1)$

Ve0420(x,y)=V444(4*t,2*s+1) where Ve0420 is the top half plane of V channel of the first YUV 4:2:0, and V444 is part h of V plane of YUV 4:4:4

$t \in (0, m/4-1) s \in (0, n/2-1)$

Ue1420(x,y)=V444(4*t+2,2*s) where Ue1420 is the bottom half plane of U channel of the first YUV 4:2:0, and V444 is part h of V plane of YUV 4:4:4

$t \in (0, m/4-1) s \in (0, n/2-1)$

Ve1420(x,y)=V444(4*t+2,2*s+1) where Ve1420 is the bottom half plane of V channel of the first YUV 4:2:0, and V444 is part h of V plane of YUV 4:4:4

$t \in (0, m/4-1) s \in (0, n/2-1)$

Yo0420(x,y)=Y444(2*t+1,s) where Yo0420 is the top half plane of Y channel of the second YUV 4:2:0, and Y444 is the entire Y plane of YUV 4:4:4

$t \in (0, m/2-1) s \in (0, n-1)$

Yo1420(x,y)=U444(2*t+1,s) where Yo1420 is the bottom half plane of Y channel of the second YUV 4:2:0, and U444 is the entire U plane of YUV 4:4:4

$t \in (0, m/2-1) s \in (0, n-1)$

Uo0420(x,y)=V444(4*t+1,2*s) where Uo0420 is the top half plane of U channel of the second YUV 4:2:0, and V444 is part h of V plane of YUV 4:4:4

$t \in (0, m/4-1) s \in (0, n/2-1)$

Vo0420(x,y)=V444(4*t+1,2*s+1) where Vo0420 is the top half plane of V channel of the second YUV 4:2:0, and V444 is part h of V plane of YUV 4:4:4

$t \in (0, m/4-1) s \in (0, n/2-1)$

Uo1420(x,y)=V444(4*t+3,2*s) where Uo1420 is the bottom half plane of U channel of the second YUV 4:2:0, and V444 is part h of V plane of YUV 4:4:4

$t \in (0, m/4-1) s \in (0, n/2-1)$

Vo1420(x,y)=V444(4*t+3,2*s+1) where Vo1420 is the bottom half plane of V channel of the second YUV 4:2:0, and V444 is part h of V plane of YUV 4:4:4

$t \in (0, m/4-1) s \in (0, n/2-1)$

FIG. 3 shows the workflow 302 of channel multiplexor method. The channel multiplexor module 302 accepts a YUV 4:4:4 frame 802 (see FIG. 8). The channel multiplexor module 302 will generate two YUV 4:2:0 frames 804a and 804b with the same resolution of the original YUV 4:4:4 frame 802. The generated frames represent a YU channel 305a and a UV channel 305b (as illustrated below) and can be directly fed into the video encoder 306 sequentially (or in parallel depending on the encoder design). The video encoder 306 will generate bit streams as the input to the transmission channel 308 which, as illustrated above, can be storage or networks. A decoder site will retrieve the bit streams from the transmission channel 308 to decode these two YUV 4:2:0 frames at decoder modules 310a and 310b. The decoded YUV 4:2:0 frames can be decomposed to a YUV 4:4:4 frame at a channel decomposite module 312 and displayed at a display 314.

Figure 8:
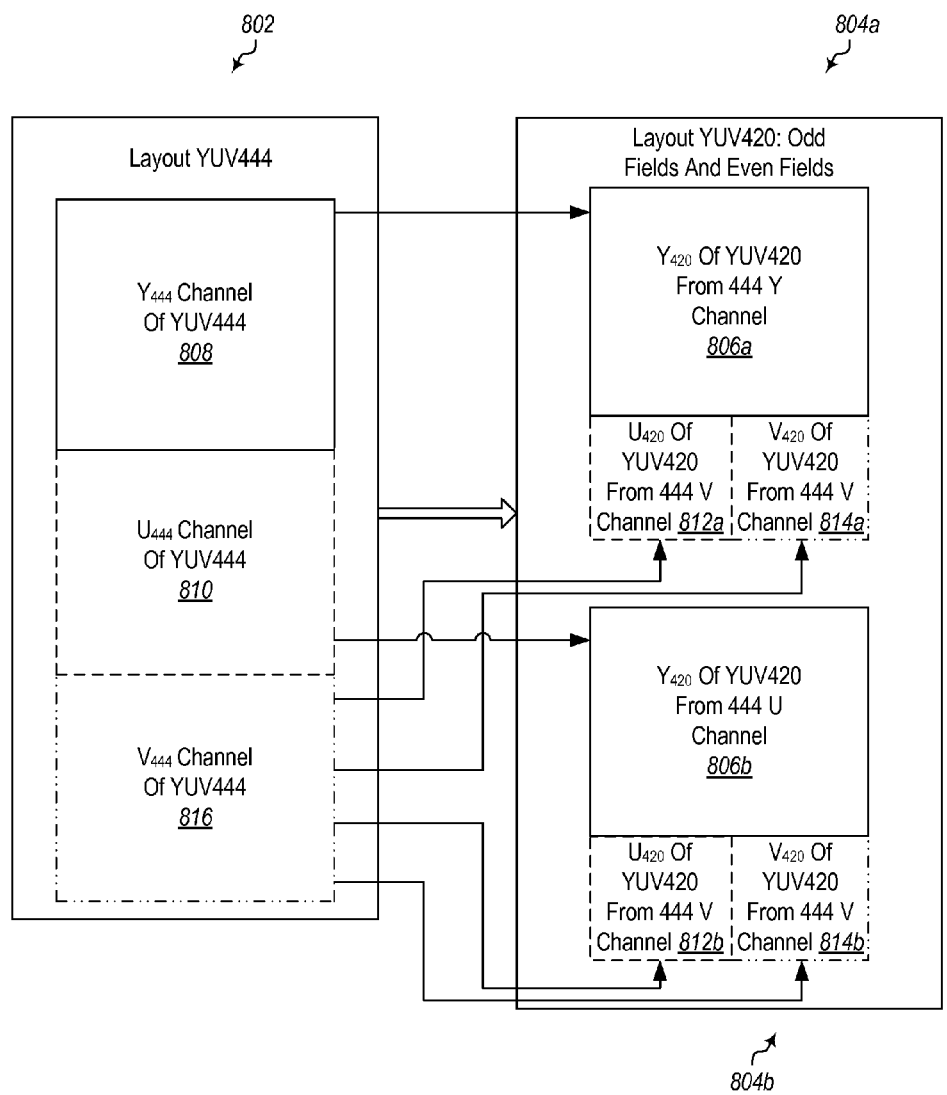
FIG. 8 illustrates additional details regarding the multiplexor method.
Figure 9:
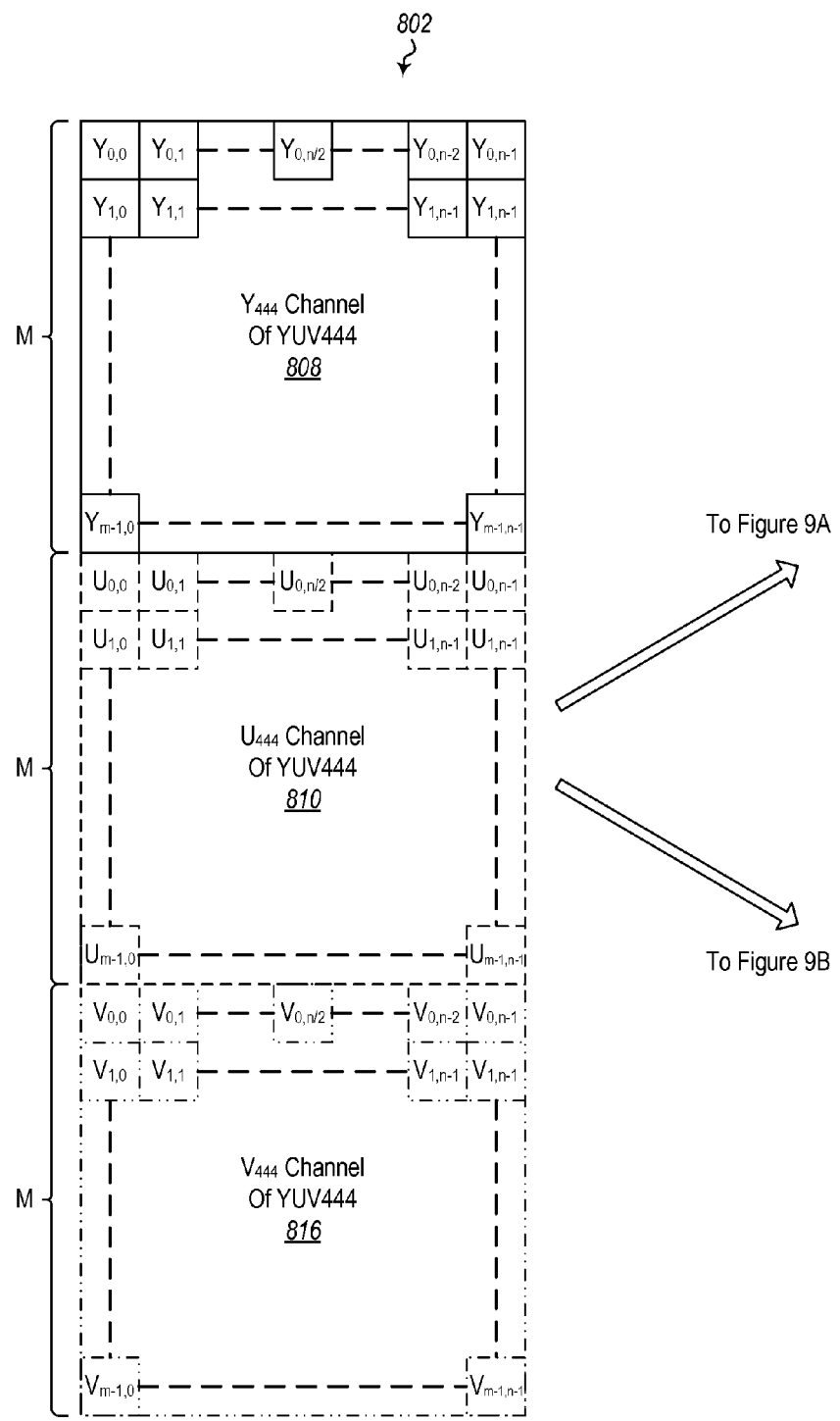
FIG. 9 illustrates additional details regarding the multiplexor method.
Figure 9A:
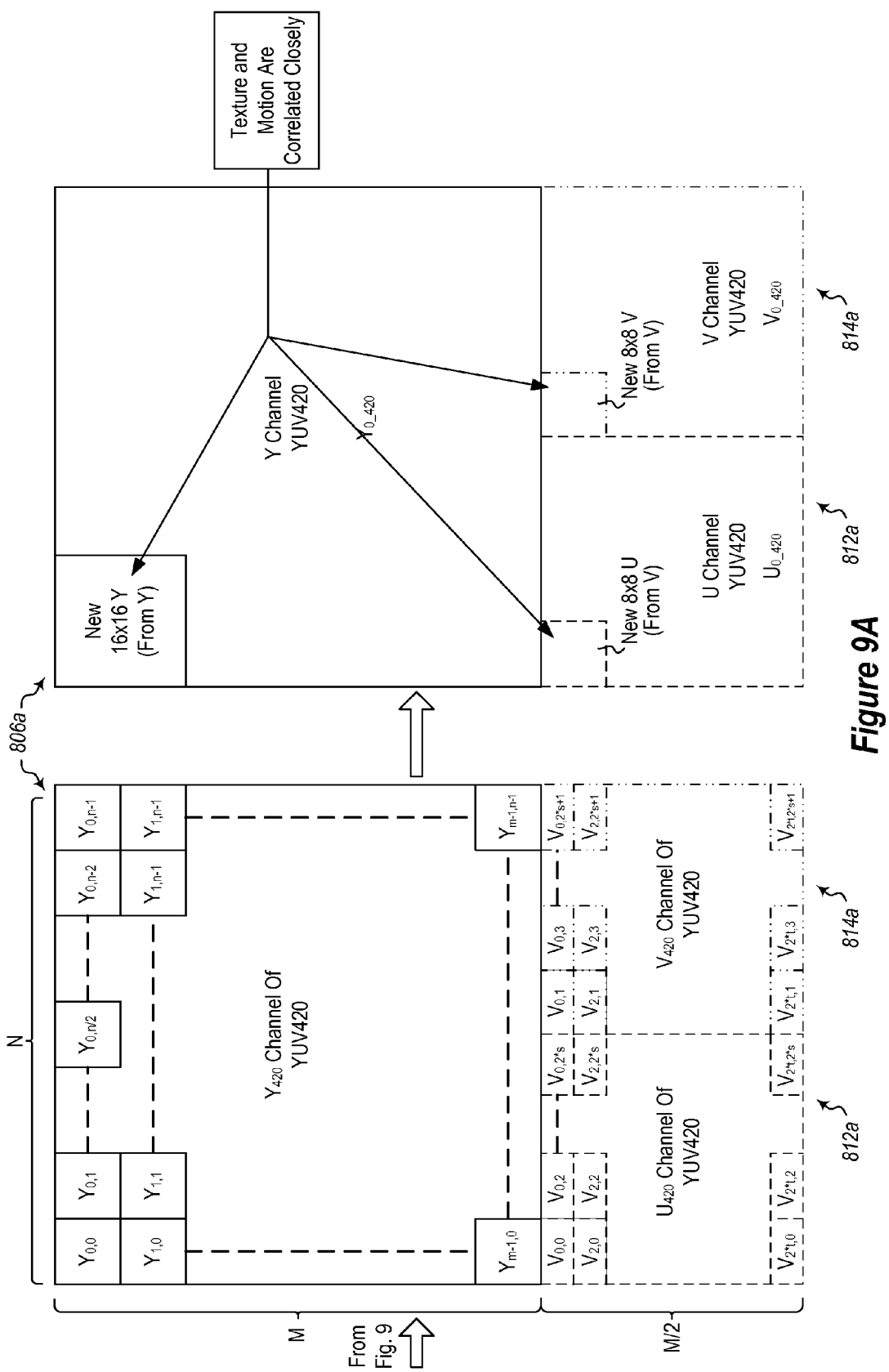
FIG. 9A illustrates additional details regarding the multiplexor method.
Figure 9B:
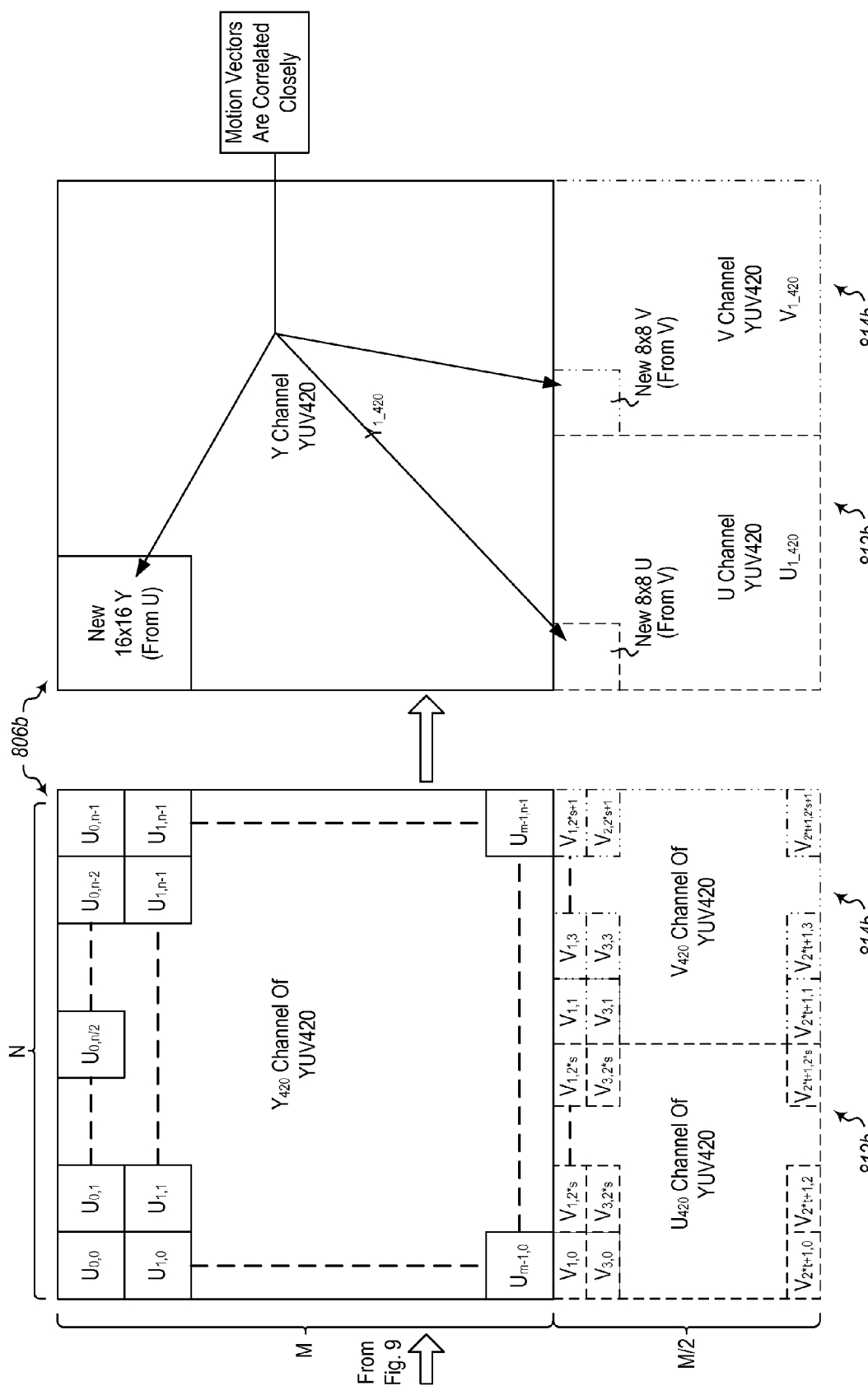
FIG. 9B illustrates additional details regarding the multiplexor method.

As shown in FIG. 8, the channel multiplexor method uses two YUV 4:2:0 container frames 804a and 804b which have the same resolution as the original YUV 4:4:4 frame. The Y channel 806a of the first YUV 4:2:0 frame 804a is composed by the Y channel 808 of the original YUV 4:4:4 frame 802. The U and V channels 812a and 814a respectively, of the first YUV 4:2:0 frame 804a are generated from the V channel 816 of the YUV 4:4:4 frame 802. The Y channel 806b of the second YUV 4:2:0 frame 804b is composed of the U channel 810 of the original YUV 4:4:4 frame 802. The U and V channels 812b and 814b respectively, of the second YUV 4:2:0 frame 804b are generated from the V channel 816 of the YUV 4:4:4 frame 802. To guarantee the temporal correlation among the generated Y, U and V channels, FIG. 9 shows how to reorganize a YUV 4:4:4 frame to a YUV 4:2:0 frame. The arrows in the FIG. 9 show the correlation among the generated Y, U and V channels. The following definitions can be used to perform the correlation of coefficients:

Y0420(x,y)=Y444(x,y) where Y0420 is the Y channel of the first YUV 4:2:0, and Y444 is the entire Y plane of YUV 4:4:4

U0420(x,y)=V444(2*t,2*s) where U0420 is the U channel of the first YUV 4:2:0, and V444 is part h of V plane of YUV 4:4:4

$t \in (0, m/2-1) s \in (0, n/2-1)$

V0420(x,y)=V444(2*t,2*s+1) where V0420 is the V channel of the first YUV 4:2:0, and V444 is part h of V plane of YUV 4:4:4

$t \in (0, m/2-1) s \in (0, n/2-1)$

Y1420(x,y)=U444(x,y) where Y1420 is the Y channel of the second YUV 4:2:0, and U444 is the entire U plane of YUV 4:4:4

U1420(x,y)=V444(2*t+1,2*s) where U1420 is the U channel of the second YUV 4:2:0, and V444 is part h of V plane of YUV 4:4:4

$t \in (0, m/2-1) s \in (0, n/2-1)$

V1420(x,y)=V444(2*t+1,2*s+1) where V1420 is the V channel of the second YUV 4:2:0, and V444 is part h of V plane of YUV 4:4:4

$t \in (0, m/2-1) s \in (0, n/2-1)$

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 10:
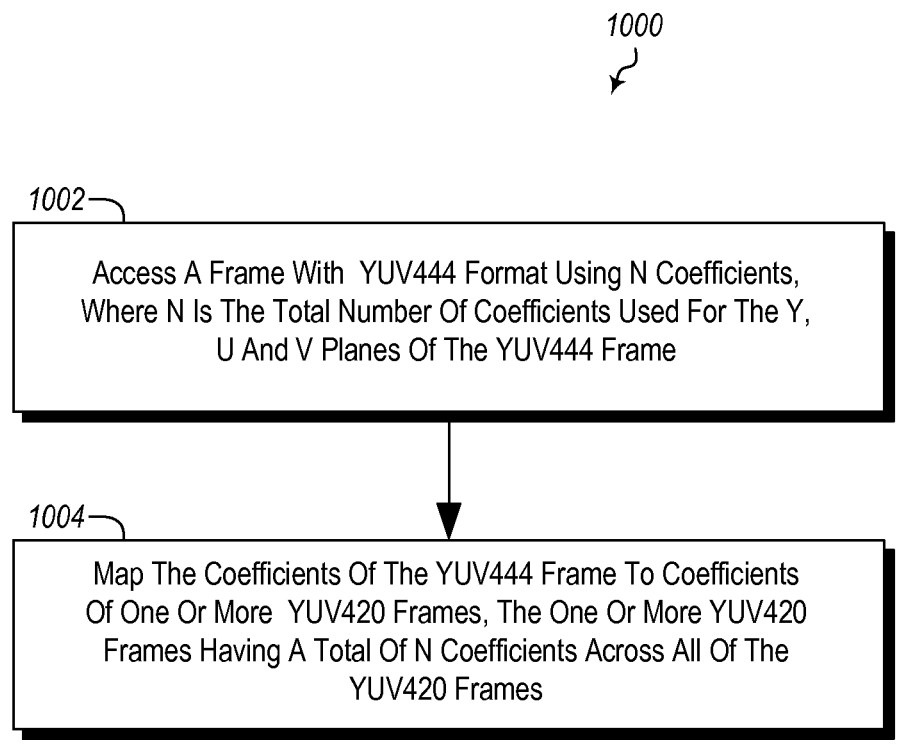
FIG. 10 illustrates a method of converting a YUV 4:4:4 frame to one or more YUV 4:2:0 frames.

Referring now to FIG. 10, a method 1000 is illustrated. The method 1000 may be practiced in a computing environment. The method 1000 includes acts for converting a first format frame (illustrated specifically as a YUV 4:4:4 frame, but may be implemented as any appropriate format frame) to one or more second format frames (illustrated as YUV 4:2:0 frames but may be implemented as any appropriate format frames).

The method 1000 includes accessing a YUV 4:4:4 frame using n coefficients (act 1002). n is the total number of coefficients used for the Y, U and V planes of the YUV 4:4:4 frame.

The method 1000 further includes mapping the coefficients of the YUV 4:4:4 frame to coefficients of one or more YUV 4:2:0 frames. The one or more YUV 4:2:0 frames have n coefficients across all of the YUV 4:2:0 frames matching the n coefficients of the YUV 4:4:4 frame (act 1004).

The method 1000 may be performed where mapping is performed based on a spatial equivalency basis between the YUV 4:4:4 frame and the one or more YUV 4:2:0 frames. For example, as illustrated above in the first algorithm as shown by FIGS. 1, 4 and 5, the one or more YUV 4:2:0 frames comprise a single YUV 4:2:0 frame with n coefficients spatially correlated to the coefficients of the YUV 4:4:4 frame. FIG. 5 illustrates that in one such example, coefficients of the Y plane of the YUV 4:4:4 frame are mapped to coefficients of the Y plane of the YUV 4:2:0 frame, coefficients of the U plane of the YUV 4:4:4 frame are mapped to coefficients of the Y plane of the YUV 4:2:0 frame, and coefficients of the V plane of the YUV 4:4:4 frame are mapped to coefficients of the U and V planes of the YUV 4:2:0 frame.

The method 1000 may be performed where mapping is performed based on a temporal equivalency basis between the YUV 4:4:4 frame and the one or more YUV 4:2:0 frames. Two examples of temporal equivalency are illustrated above. The first is shown by the second algorithm illustrated by the interleaving method of FIGS. 2, 6 and 7 and the second is shown by the third algorithm illustrated by the multiplexor method of FIGS. 3, 8 and 9.

Thus, such temporal equivalency may be achieved where the one or more YUV 4:2:0 frames comprises m YUV 4:2:0 frames with n/m coefficients for each frame and where the set of coefficients including all coefficients in the one or more YUV 4:2:0 frames is temporally correlated to the set of coefficients of the YUV 4:4:4 frame.

The method 1000 may be practiced where the one or more YUV 4:2:0 frames comprise two YUV 4:2:0 frames each frame having n/2 coefficients. A first portion of the Y plane coefficients of the YUV 4:4:4 frame are mapped to the Y plane coefficients of a first YUV 4:2:0 frame and a second portion of the Y plane coefficients of the YUV 4:4:4 frame are mapped to the Y plane coefficients of a second YUV 4:2:0 frame. A first portion of the U plane coefficients of the YUV 4:4:4 frame are mapped to the Y plane coefficients of the first YUV 4:2:0 frame and a second portion of the U plane coefficients of the YUV 4:4:4 frame are mapped to the Y plane coefficients of the second YUV 4:2:0 frame. A first portion of the V plane coefficients of the YUV 4:4:4 frame are mapped to the V plane coefficients of the first YUV 4:2:0 frame and a second portion of the V plane coefficients of the YUV 4:4:4 frame are mapped to the V plane coefficients of the second YUV 4:2:0 frame. An example of this is illustrated in FIGS. 6 and 7.

The method 1000 may be practiced where the one or more YUV 4:2:0 frames comprises two YUV 4:2:0 frames each frame having n/2 coefficients. The Y plane coefficients of the YUV 4:4:4 frame are mapped to the Y plane coefficients of a first YUV 4:2:0 frame. U plane coefficients of the YUV 4:4:4 frame are mapped to the Y plane of a second YUV 4:2:0 frame. A first portion of the V plane coefficients of the YUV 4:4:4 frame are mapped to the U and V planes of the first YUV 4:2:0 frame and a second portion of the V plane coefficients of the YUV 4:4:4 frame are mapped to the U and V planes of a second YUV 4:2:0 frame. An example of this is illustrated in FIGS. 8 and 9.

The method 1000 may further include mapping the coefficients of the one or more YUV 4:2:0 frames to coefficients of an output YUV 4:4:4 frame and displaying the output frame. For example, as illustrated in FIGS. 1, 2 and 3, the frames can be YUV 4:4:4 frames and displayed on the displays 114, 214 or 314.

While the above examples have been illustrated as conversions from YUV 4:4:4 to YUV 4:2:0, it should be appreciated that other conversions can be accomplished. For example, embodiments may be used to convert YUV 4:4:4 to YUV 4:1:1, YUV 4:2:2 or other formats.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a method of converting a first format frame to one or more second format frames, the method comprising:
    accessing a first format frame using n coefficients, where n is the total number of coefficients used for the Y, U and V planes of the first format frame; and
    mapping the coefficients of the first format frame to coefficients of one or more second format frames, the one or more second format frames having n coefficients across all of the second format frames matching the n coefficients of the first format frame.

2. The method of claim 1, wherein mapping is performed based on a spatial equivalency basis between the first format frame and the one or more second format frames.

3. The method of claim 2, wherein the one or more second format frames comprises a single second format frame with n coefficients spatially correlated to the coefficients of the first format frame.

4. The method of claim 3, wherein coefficients of the Y plane of the first format frame are mapped to coefficients of the Y plane of the second format frame, coefficients of the U plane of the first format frame are mapped to coefficients of the Y plane of the second format frame, and coefficients of the V plane of the first format frame are mapped to coefficients of the U and V planes of the second format frame.

5. The method of claim 1, wherein mapping is performed based on a temporal equivalency basis between the first format frame and the one or more second format frames.

6. The method of claim 5, wherein the one or more second format frames comprises m second format frames with n/m coefficients for each frame and where the set of coefficients including all coefficients in the one or more second format frames is temporally correlated to the set of coefficients of the first format frame.

7. The method of claim 6, wherein the one or more second format frames comprises two second format frames each frame having n/2 coefficients, and where:
    a first portion of the Y plane coefficients of the first format frame are mapped to the Y plane coefficients of a first second format frame and a second portion of the Y plane coefficients of the first format frame are mapped to the Y plane coefficients of a second second format frame;
    a first portion of the U plane coefficients of the first format frame are mapped to the Y plane coefficients of the first second format frame and a second portion of the U plane coefficients of the first format frame are mapped to the Y plane coefficients of the second second format frame; and
    a first portion of the V plane coefficients of the first format frame are mapped to the V plane coefficients of the first second format frame and a second portion of the V plane coefficients of the first format frame are mapped to the V plane coefficients of the second second format frame.

8. The method of claim 6, wherein the one or more second format frames comprises two second format frames each frame having n/2 coefficients, and where:
    the Y plane coefficients of the first format frame are mapped to the Y plane coefficients of a first second format frame;
    U plane coefficients of the first format frame are mapped to the Y plane of a second second format frame; and
    a first portion of the V plane coefficients of the first format frame are mapped to the U and V planes of the first second format frame and a second portion of the V plane coefficients of the first format frame are mapped to the U and V planes of a second second format frame.

9. The method of claim 1, further comprising mapping the coefficients of the one or more second format frames to coefficients of an output first format frame and displaying the output frame.

10. The method of claim 1, wherein the first format frame is a YUV 4:4:4 frame and the second format frame is a YUV 4:2:0 frame.

11. A computer readable hardware storage device comprising computer executable instructions that when executed by one or more processors cause a computing system to perform the following:
    accessing a first format frame using n coefficients, where n is the total number of coefficients used for the Y, U and V planes of the first format frame; and
    mapping the coefficients of the first format frame to coefficients of one or more second format frames, the one or more second format frames having n coefficients across all of the second format frames matching the n coefficients of the first format frame.

12. The computer readable hardware storage device of claim 11, wherein mapping is performed based on a spatial equivalency basis between the first format frame and the one or more second format frames.

13. The computer readable hardware storage device of claim 12, wherein the one or more second format frames comprises a single second format frame with n coefficients spatially correlated to the coefficients of the first format frame.

14. The computer readable hardware storage device of claim 13, wherein coefficients of the Y plane of the first format frame are mapped to coefficients of the Y plane of the second format frame, coefficients of the U plane of the first format frame are mapped to coefficients of the Y plane of the second format frame, and coefficients of the V plane of the first format frame are mapped to coefficients of the U and V planes of the second format frame.

15. The computer readable hardware storage device of claim 11, wherein mapping is performed based on a temporal equivalency basis between the first format frame and the one or more second format frames.

16. The computer readable hardware storage device of claim 15, wherein the one or more second format frames comprises m second format frames with n/m coefficients for each frame and where the set of coefficients including all coefficients in the one or more second format frames is temporally correlated to the set of coefficients of the first format frame.

17. The computer readable hardware storage device of claim 16, wherein the one or more second format frames comprises two second format frames each frame having n/2 coefficients, and where:
   a first portion of the Y plane coefficients of the first format frame are mapped to the Y plane coefficients of a first second format frame and a second portion of the Y plane coefficients of the first format frame are mapped to the Y plane coefficients of a second second format frame;
   a first portion of the U plane coefficients of the first format frame are mapped to the Y plane coefficients of the first second format frame and a second portion of the U plane coefficients of the first format frame are mapped to the Y plane coefficients of the second second format frame; and
   a first portion of the V plane coefficients of the first format frame are mapped to the V plane coefficients of the first second format frame and a second portion of the V plane coefficients of the first format frame are mapped to the V plane coefficients of the second second format frame.

18. The computer readable hardware storage device of claim 16, wherein the one or more second format frames comprises two second format frames each frame having n/2 coefficients, and where:
   the Y plane coefficients of the first format frame are mapped to the Y plane coefficients of a first second format frame;
   U plane coefficients of the first format frame are mapped to the Y plane of a second second format frame; and
   a first portion of the V plane coefficients of the first format frame are mapped to the U and V planes of the first second format frame and a second portion of the V plane coefficients of the first format frame are mapped to the U and V planes of a second second format frame.

19. The computer readable hardware storage device of claim 11, further comprising computer executable instructions that when executed by one or more processors cause a computing system to map the coefficients of the one or more second format frames to coefficients of a first format frame and display the output frame.

20. In a computing environment, a system for converting a YUV 4:4:4 frame to one or more YUV 4:2:0, YUV 4:2:2 or YUV 4:1:1 frames, the system comprising
   one or more processors; and
   one or more computer readable media, wherein the one or more computer readable media comprise computer executable instructions that when executed by at least one of the one or more processors cause at least one of the one or more processors to perform the following:
      access a YUV 4:4:4 frame using n coefficients, where n is the total number of coefficients used for the Y, U and V planes of the YUV 4:4:4 frame; and
      map the coefficients of the YUV 4:4:4 frame to coefficients of one or more YUV 4:2:0, YUV 4:2:2 or YUV 4:1:1 frames, the one or more YUV 4:2:0, YUV 4:2:2 or YUV 4:1:1 frames having n coefficients across all of the YUV 4:2:0, YUV 4:2:2 or YUV 4:1:1 frames matching the n coefficients of the YUV 4:4:4 frame.

21. A computing system for converting a first format frame to one or more second format frames, the computing system comprising:
   one or more processors; and
   one or more computer readable media, wherein the one or more computer readable media comprise computer executable instructions that when executed by at least one of the one or more processors cause at least one of the one or more processors to perform a method that includes:
      the computing system accessing a first format frame using n coefficients, where n is the total number of coefficients used for the Y, U and V planes of the first format frame; and
      the computing system mapping the coefficients of the first format frame to coefficients of one or more second format frames, the one or more second format frames having n coefficients across all of the second format frames matching the n coefficients of the first format frame.

* * * * *